United States Patent [19]
Hansson

[11] 3,761,099
[45] Sept. 25, 1973

[54] SEALS FOR ROTARY AND AXIALLY MOVABLE SHAFTS

[75] Inventor: Hans John Olof Hansson, Halmstad, Sweden

[73] Assignees: Lars Jan Herman Hanson; Anders Walter Andersson, Halmstead, Sweden

[22] Filed: Dec. 10, 1970

[21] Appl. No.: 96,958

[52] U.S. Cl. ................. 277/37, 277/65, 277/206 R
[51] Int. Cl. ............................................ F16j 15/32
[58] Field of Search ................. 277/35, 25, 37, 38, 277/39, 56, 58, 153, 174, 206.1, 65.81

[56] References Cited
UNITED STATES PATENTS
2,888,281   5/1959   Ratti .................................. 277/25
3,442,516   5/1969   Voitik ................................. 277/39
3,179,424   4/1965   Carson et al. ..................... 277/39 X
3,545,774   12/1970  Rickley .............................. 277/235

Primary Examiner—George E. Lowrance
Assistant Examiner—Robert I. Smith
Attorney—John Lezdey

[57] ABSTRACT

A seal for a rotary and axially movable shaft comprises a stationary outer element and an inner element axially guided in said outer element but freely rotatable therein, said inner element consisting of a sealing lip which is in elastic engagement with the shaft, a main portion in sealing elastic engagement with the outer element, and a collar interconnecting said two details, the engagement of the sealing lip with the shaft being stronger than that of the main portion with the outer element.

1 Claim, 15 Drawing Figures

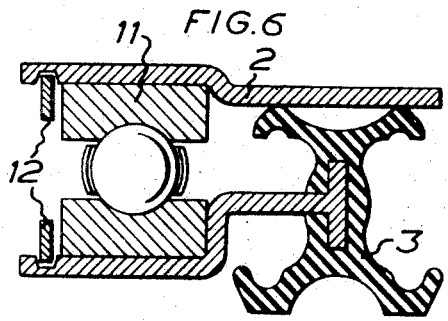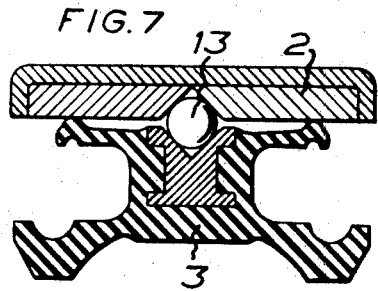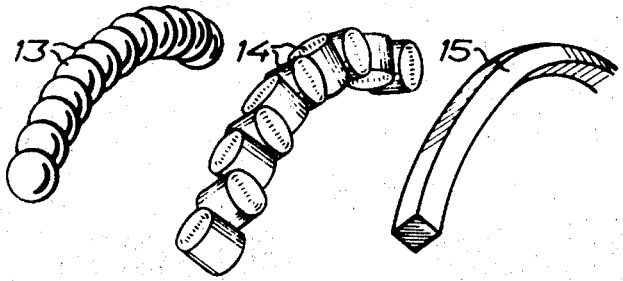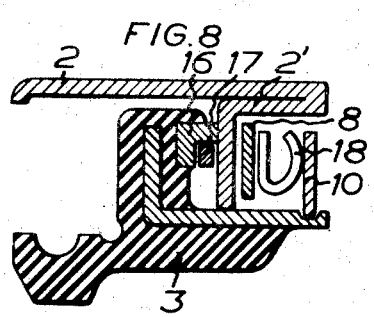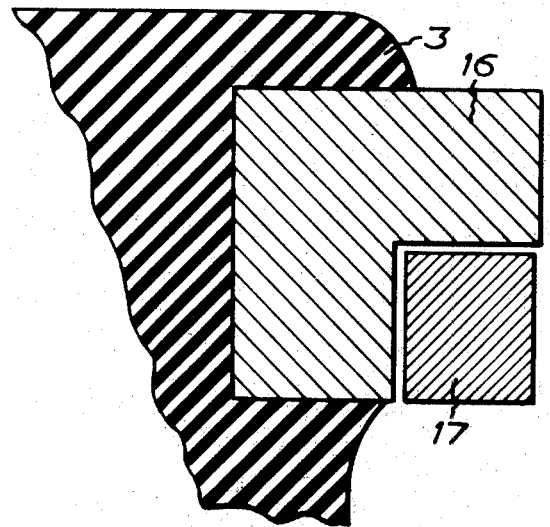

SEALS FOR ROTARY AND AXIALLY MOVABLE SHAFTS

This invention relates to a seal for a rotary and axially movable shaft of substantially circular cross section in a substantially circular duct between two spaces to be sealed from one another, said seal comprising an outer element of the same shape as the duct and retained therein, and an inner element which is prevented from moving axially in said outer element by axial guide means but is freely rotatable therein.

Experiences earlier made in machine constructions have shown that apart from a satisfactory sealing capacity for the purpose concerned a seal should have the following two essential properties:

1. The seal must not cause damage to machine parts, preferably the shaft to be sealed, by scoring it. Such an undesirable wear is disadvantageous in several respects; first of all the wear may result in leakage, but in the long run scoring of the shaft may become so pronounced that no renewed sealing can be obtained although a new seal is mounted. Besides, scoring of a shaft may lead to rupture, and as a secondary effect the leakage may damage other machine elements.

2. In many cases the seal should be readily axially movable, for instance on a shaft, with retained sealing ability. With axially movable seals, mounting and dismounting operations will be simplified.

Various constructions are previously known for overcoming the disadvantage mentioned in item 1. Generally, these constructions operate with a seal that is stationary with respect to the shaft, the relative movement occurring in the seal itself. Examples of such constructions are given in Swedish Pat. Nos. 204,587, 222,611, 302,550, German Pat. Nos. 717,627, 972,476, 1,027,944, French Pat. Nos. 936,483, 1,145,882, 1,267,966, 1,446,753 and U.S. Pat. Nos. 2,240,252, 2,478,140, 2,784,017. However, none of these constructions allow the axial movability mentioned in item 2, which mostly is not only essential but even necessary.

The present invention thus relates to a seal of the type outlined in the foregoing. Characteristic of this seal is that the inner element consists of a sealing lip which is in sealing elastic engagement with the shaft by the action of a biasing spring, a main portion in sealing elastic engagement with the outer element, and a collar which allows radial shaft movements, wholly interconnects the sealing lip and the main portion and extends mainly axially, and upon rotary shaft movement only the engagement of the sealing lip with the shaft is strong enough by reason of the dimensions of the biasing spring and the sealing lip to overcome the total frictional resistance arising from the axial guide means and the engagement of the main portion with the outer element so that all relative sliding movement in this case takes place between the main portion and the outer element, but upon axial and combined axial and rotary shaft movements is loose enough to allow axial movements with retained sealing capacity.

The invention will now be described in more detail hereinbelow with reference to the accompanying drawings in which:

FIGS. 2–8 show sections of various structural embodiments of the seal, FIGS. 5a, 7a, b, c and 8a illustrating details of FIGS. 5, 7 and 8, respectively;

The same details have been given the same reference numerals in the various embodiments.

Figure 1:
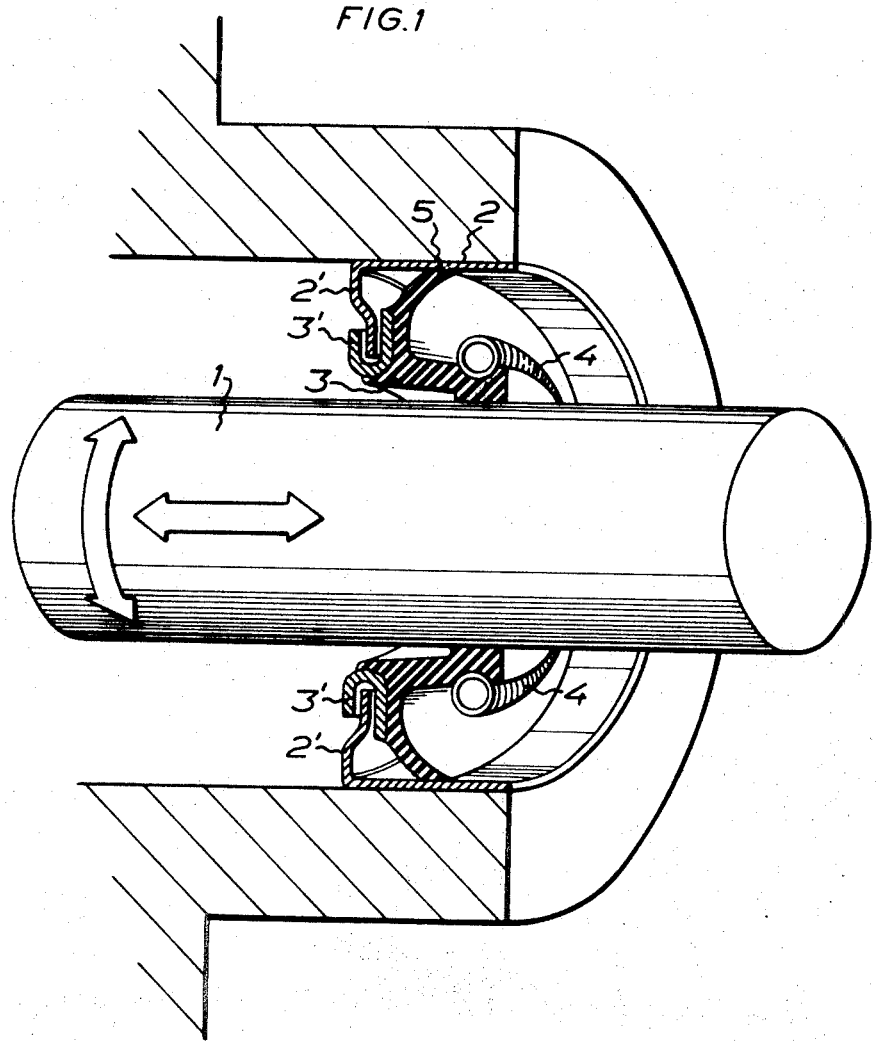
FIG. 1 shows a side view, partly in section, of a shaft sealed in a shaft duct by means of a seal according to the invention.

FIG. 1 shows a seal according to the invention in gripping engagement with a shaft 1 which can effect a rotary and also axial movement, as is indicated by the arrows. The seal arranged in the shaft duct comprises two main elements, namely an outer element 2 of metal or other suitable structural material which is fixedly arranged in the shaft duct, and an inner element 3 which predominantly consists of rubber and like material having elastic properties.

Provided between the outer and inner elements is positive axial guide means which in the case illustrated in FIG. 1 is realized in that the outer element has an inwardly extending flange 2' and the inner element has a guide channel 3' in the form of a groove which is fixedly vulcanized to the rubber detail. The dimensions of the flange 2' and the channel 3' are such that the channel can substantially freely rotate in relation to the flange.

The inner element 3 elastically engages the shaft 1 on the one hand and the outer element 2 on the other hand, the shaft engagement being ensured by a biasing spring 4 in a conventional manner. By reason of suitable dimensions the engagement conditions of the inner element with the shaft and the outer element are such that the relative movement and thus the wearing sliding movement upon rotation of the shaft occurs between the inner and the outer element at 5, whereas the inner element rotates without any sliding movement together with the shaft. Upon axial movement, however, the inner element of the seal thanks to the axial guide means must slide with respect to the shaft without, however, causing any direct wear of the shaft.

By this fundamentally new construction it is realized on one hand that no wear is exerted on the shaft which can therefore be manufactured without placing the usual high requirements on material and surface finish, and on the other hand that the elements of the seal which are gradually worn out can easily be exchanged, so that full sealing capacity is again established.

Figure 2:
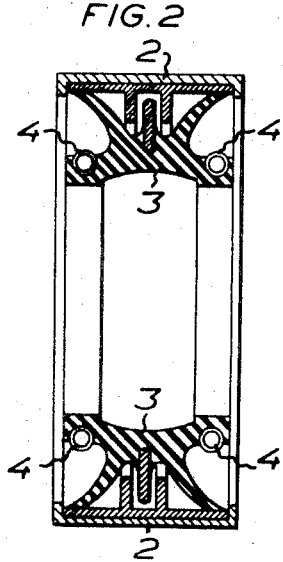

The embodiment illustrated in FIG. 1 has for its purpose to provide seal against pressure from one side, whereas the embodiment illustrated in FIG. 2 is intended to provide seal against pressure from two sides. The fundamental construction otherwise is the same, and it is thus possible to discern the outer element 2, the inner element 3, the biasing ring or spring 4, and the axial guide means which in the present instance is built up of parts separate from the outer element to permit a more free choice of materials.

Figure 3:
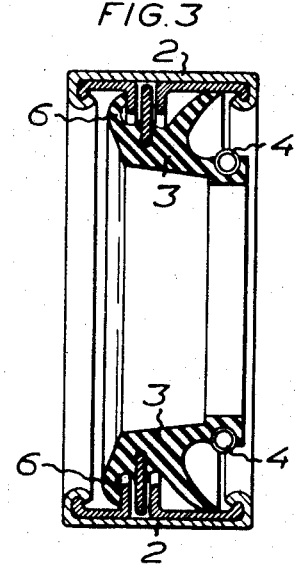

The embodiment illustrated in FIG. 3 corresponds both to that illustrated in FIG. 1 and to that illustrated in FIG. 2 and is intended to provide a seal against pressure from one side. However, the inner element is provided with a lip 6 sealing against dust or insignificant pressure from the other side.

Figure 4:
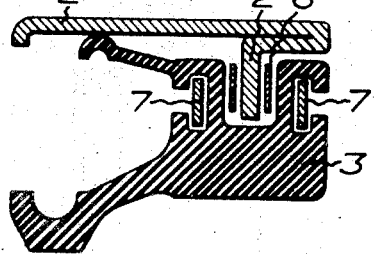

In the embodiments hitherto described the inner element was in the form of an elastic detail fixedly vulcanized to a separate guide member, but it is also conceivable to make the inner element entirely of rubber or like material. An example of such a design is shown in FIG. 4. Here, the outer element 2 is made of bent sheet metal, nylon or the like and is provided with a guide flange 2'. The inner element 3 has been provided with reinforcing steel disks 7 which are placed in suitable slits and prevent the inner element from being forced out of the outer element when the seal is in operation. To reduce friction at the axial guide means a disk 8 of Teflon or like material is placed on either side of the flange 2'.

Figure 5:
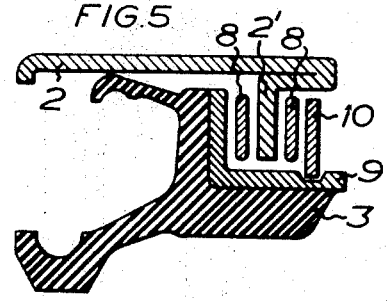
Figure 5A:
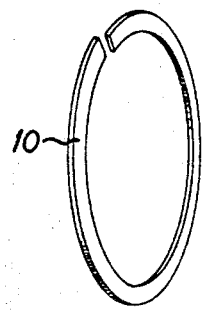

In FIG. 5 the same outer element is provided as in FIG. 4 and also the friction reducing rings 8, whereas the elastic portion of the inner element is fixedly vulcanized to a sheet metal sleeve 9 having a groove for a spring washer 10, FIG. 5a, which retains the axial guide means in position.

The axial guide means can be designed in several different ways, special embodiments being exemplified in FIGS. 6 and 7. In FIG. 6 the axial guide means is in the form of a ball bearing 11 which is kept clamped in position with the aid of spring washers 12. The seal is here shown in double-sided configuration. In the embodiment shown in FIG. 7 the outer and inner element, respectively, has a V-shaped groove in which run balls 13 (FIG. 7a), rollers 14 (FIG. 7b) or a suitably profiled strip 15 (FIG. 7c) of friction reducing material. This seal also is of double-sided configuration but it should be observed that this seal like the other seals illustrated can be given a single- or double-sided configuration, as desired.

The embodimeht illustrated in FIG. 8 mostly resembles the embodiment shown in FIG. 5, but in this instance the elastic element does not seal directly against the inner circumferential surface of the outer element but with the aid of a graphite or bakelite ring seal 16 against the flange 2'. This ring 16 has a groove for a ring 17 of Teflon or like material for reducing wear and friction. FIG. 8a shows this embodiment of the seal bearing against the outer element more in detail. On the other side of the flange 2' there is provided, in addition to the friction reducing ring 8 and the retaining spring washer 10 also an axially biasing spring 18.

Figure 9:
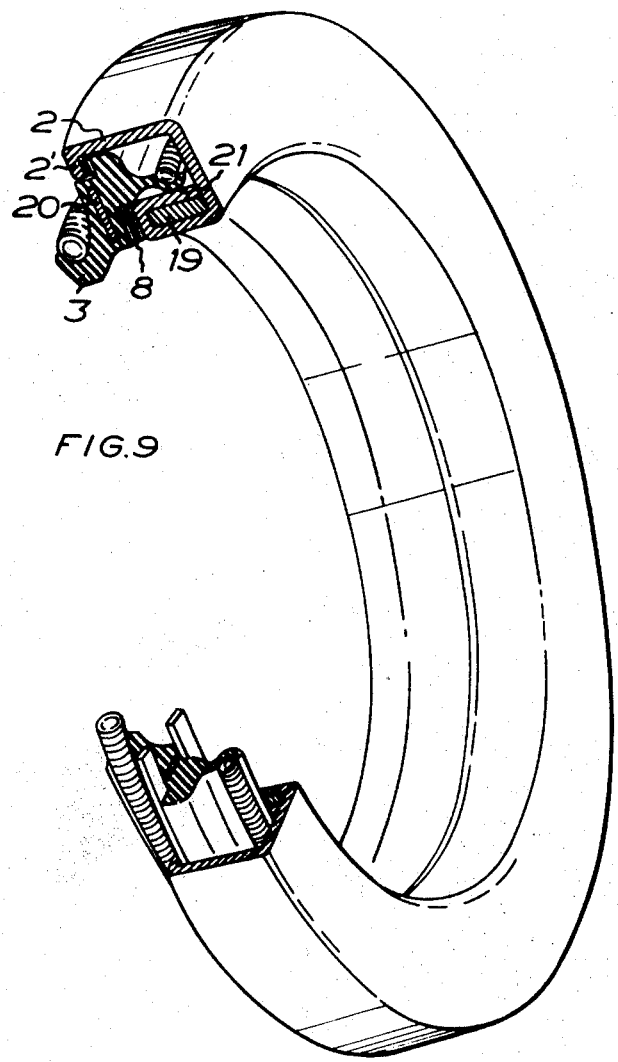
FIG. 9 shows a perspective view, with certain parts broken away, of a structurally suitable embodiment of the seal according to the invention.
Figure 9A:
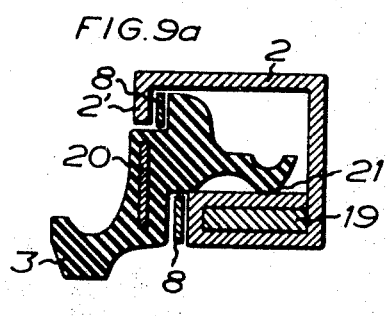
FIG. 9a shows a section of the seal in FIG. 9.

The seal illustrated in FIGS. 9 and 9a is to be regarded as an embodiment suitable for mass production, while still retaining the same fundamental principle as in the earlier embodiments. The outer element 2 is a sheet metal detail bent into the configuration shown, a ring 19 being provided as a reinforcement. The inner element has a reinforcing ring 20 which is totally encased in the rubber. The engagement of the inner element with the outer element in this case does not take place either against the inner surface of the outer circumferential portion or against the flange 2' but inwardly against the outer surface of the inner portion 21 of the outer element. Axial guiding here takes place by the action of friction reducing rings 8 at the axial flange 2' and at the inner portion of the outer element.

In all of these embodiments of seals according to the invention the outer and inner element, respectively rotates relative to the element, when the shaft rotates (is axially stationary) and no wear occurs outside the seal. At combined axial and rotary movement the shaft slides in the inner biased collar of the inner elemnet. When the axial movement ceases the outer and inner element, respectively, of the seal resumes its described rotary movement relative to the other element without sliding on the shaft.

In the foregoing, reference has been made to a shaft movable in a duct, but the opposite, technically equivalent relation is also conceivable, viz. that the shaft is stationary and the duct located in a movable element such as a hub or like part. In this case, of course, the shape of the seal is inversed. The invention can thus be realized with the same advantages in providing such a solution.

I claim:

1. A continuous seal between a shaft of substantially circular cross section and a member having a substantially circular duct for the shaft formed therein, the shaft and the member being rotatable and axially movable in relation to each other, said seal comprising:
   a rigid outer element with an axial portion having an outer diameter the same as the inner diameter of said duct and retained by tight fit therein, said outer element having a radial portion extending toward said shaft,
   an elastic inner element freely rotatable in said outer element, said inner element having an inner lip with continuous sealing elastic engagement with said shaft, and an outer lip in continuous sealing engagement with the axial portion of said outer element, means having a radially outwardly opening channel secured to said inner element and receiving said radially extending portion of said outer element within its open channel
   biasing means arranged around said inner lip for contributing to the continuous engagement of said inner lip with said shaft, whereby the engagement of the lip with the shaft upon rotary movement of the shaft in relation to the member being strong enough by reason of the dimensions of the biasing means and the lip to overcome the total frictional resistance arising from said channel and radially extending portion of said outer element and the engagement of the outer lip with the outer element so that all relative sliding movement in this case takes place between the outer lip and the outer element, but on axial and combined axial and rotary movements of the shaft in relation to said member being loose enough to allow relative axial movements between said inner lip and said shaft with retained sealing capacity.

* * * * *